US006390226B1

(12) United States Patent
Smith et al.

(10) Patent No.: US 6,390,226 B1

(45) Date of Patent: May 21, 2002

(54) DIFFERENTIAL LOCK ENGAGING ARRANGEMENT

(75) Inventors: Derek John Smith, West Midlands; David William Seccull, Coventry, both of (GB)

(73) Assignee: ARGO Limited (GB)

( * ) Notice: Subject to any disclaimer, the term of this patent is extended or adjusted under 35 U.S.C. 154(b) by 0 days.

(21) Appl. No.: 09/468,048

(22) Filed: Dec. 21, 1999

(30) Foreign Application Priority Data

Dec. 23, 1998 (GB) ............................................ 9828515

(51) Int. Cl.[7] ............................................ B60K 17/00

(52) U.S. Cl. ....................... 180/337; 180/374; 180/375; 180/378; 180/379; 180/336; 24/527

(58) Field of Search ................................ 180/336, 337, 180/374, 375, 378, 379; 74/527

(56) References Cited

U.S. PATENT DOCUMENTS

| | | | | | |
|---|---|---|---|---|---|
| 3,963,088 A | | 6/1976 | Gunderson | | |
| 4,113,044 A | * | 9/1978 | Williams et al. | ........ | 180/337 X |
| 4,126,202 A | * | 11/1978 | Hern | ...................... | 180/337 X |
| 4,150,586 A | * | 4/1979 | Mueller, Jr. | ............. | 180/337 X |
| 4,469,208 A | * | 9/1984 | Hansen | .................. | 180/327 X |
| 4,584,899 A | * | 4/1986 | Old et al. | ............... | 180/377 X |
| 4,793,207 A | * | 12/1988 | Old | ........................ | 180/337 X |
| 5,323,890 A | * | 6/1994 | Okada et al. | ............... | 180/337 |

FOREIGN PATENT DOCUMENTS

| | | | | |
|---|---|---|---|---|
| EP | 0292620 | * 11/1988 | ............ | 180/377 X |
| GB | 1092522 | 11/1967 | | |
| GB | 2175360 | 11/1986 | | |
| JP | 64-16468 | 1/1989 | | |

* cited by examiner

*Primary Examiner*—Lanna Mai
*Assistant Examiner*—Toan C To
(74) *Attorney, Agent, or Firm*—MacMillan, Sobanski & Todd, LLC

(57) ABSTRACT

A differential lock actuating arrangement comprises a pedal assembly including a substantially elongate member, mounting means to mount the said elongate member on the chassis of a vehicle, means to connect the said elongate member to a differential lock actuator, rotating means to rotate the said substantially elongate member about its longitudinal axis, wherein the mounting means mounts the said elongate member for movement between a first differential lock engaging position and a second differential lock disengaging position, and wherein the arrangement further comprises biasing means to hold the elongate member in one of the said first and second positions.

1 Claim, 4 Drawing Sheets

DIFFERENTIAL LOCK ENGAGING ARRANGEMENT

FIELD OF THE INVENTION

This invention relates to an arrangement for engaging a differential lock, and in particular to a mechanical arrangement for engaging the differential lock in the back axle of a vehicle such as an agricultural tractor.

BACKGROUND TO THE INVENTION

Agricultural tractors are usually provided with a differential lock in the back axle for reasons well known to those skilled in the art.

One requirement of a differential lock arrangement for a tractor is that it can be easily engaged and disengaged. In fieldwork the driver must be able to engage the differential lock quickly when one drive wheel starts to spin faster than the other. Furthermore, tractors are required to make tight headland turns, and therefore it must be possible to disengage the differential lock quickly, otherwise the tractor driver will not be able to turn the vehicle and may crash into a hedge or ditch with possible disastrous consequences.

It is known to provide electro-hydraulic control systems, which engage and disengage the differential lock at the flick of a switch. In more complicated control systems sensors engage and disengage the differential lock automatically to ensure the optimum and safe performance of the tractor.

In many countries of the world there is not the requirement for, or the ability to maintain, complex electro-hydraulic control systems, and there is therefore a need to control engagement and disengagement of the differential lock mechanically. The present invention is concerned with mechanical arrangements for engaging and disengaging the differential lock.

In one known mechanical arrangement for controlling the engagement and disengagement of the differential lock a pedal is mounted on the tractor chassis. To engage the differential lock the tractor driver depresses the pedal with his foot. The tractor driver must keep his foot on the pedal whilst he wishes to have the differential lock engaged. When the driver removes his foot from the pedal the differential lock moves out of engagement.

When using a tractor for fieldwork, for example ploughing, engagement of the differential lock may be required most of the time. It would therefore be desirable to provide a mechanical differential lock engaging arrangement which does not require the driver to constantly depress a pedal whilst engagement of the differential lock is required.

EP292620 describes a differential lock pedal control system, which upon depression of the pedal, engages the differential lock. The differential lock is maintained in engagement by the control system when the driver removes his foot from the pedal. When the driver wishes to disengage the differential lock he depresses the pedal again, and the control system disengages the differential lock.

The pedal control system described in EP262620 comprises many parts, is complex, and expensive to manufacture.

It would therefore be desirable to provide a mechanical differential lock control arrangement which does not suffer from the problems associated with the prior art.

SUMMARY OF THE INVENTION

The invention provides a differential lock actuating arrangement comprising a pedal assembly including a substantially elongate member, mounting means to mount the said elongate member on the chassis of a vehicle, means to connect the said elongate member to a differential lock actuator, rotating means to rotate the said substantially elongate member about its longitudinal axis, wherein the mounting means mounts the said elongate member for movement between a first differential lock engaging position and a second differential lock disengaging position, and wherein the arrangement further comprises biasing means to hold the elongate member in one of the said first and second positions.

Preferably, the means to connect the said elongate member to the differential lock actuator comprises an over-centre cam mechanism. The over-centre cam mechanism may comprise a bracket fixed to the said substantially elongate member, and a linking member, wherein one end of the said linking member is pivotally attached to the differential lock actuator and the other end is pivotally attached to the said bracket.

Preferably, the mounting means includes a bracket comprising a slot, wherein the substantially elongate member is mounted in the said slot, and is permitted to move in the longitudinal direction of the slot, and wherein the biasing means is arranged to pull the elongate member towards the closed end of the slot. The biasing means may be attachable to the bracket and the substantially elongate member. The substantially elongate member may be provided with stops, which co-operate with the bracket to limit movement of the substantially elongate member in its longitudinal direction.

The rotating means may comprise a lever extending to either side of the longitudinal axis of the said substantially elongate member, and preferably, the lever is provided with engagement members, wherein upon exertion of pressure on one of the engagement members, the substantially elongate member is caused to rotate. Advantageously, the engagement members each comprise a pedal.

The invention also provides a tractor comprising a differential lock actuating arrangement as described.

BRIEF DESCRIPTION OF THE DRAWINGS

In the drawings, which illustrate exemplary embodiments of the invention.

DETAILED DESCRIPTION OF THE PREFERRED EMBODIMENTS

Figure 1:
FIG. 1 is a plan view of differential lock control system according to the invention.
Figure 2:
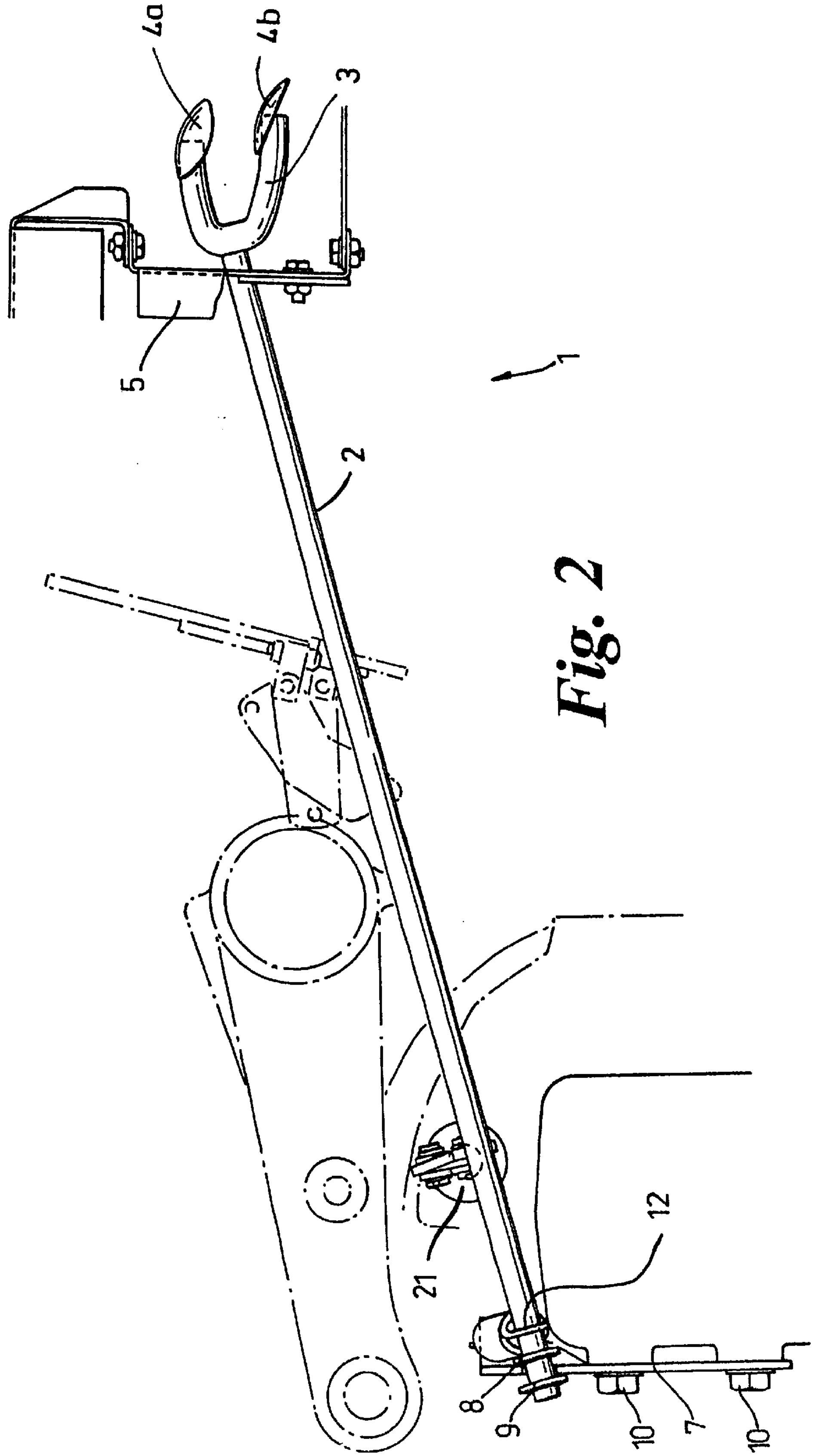
FIG. 2 is a side view of the differential lock control system shown in FIG. 1.
Figure 3:
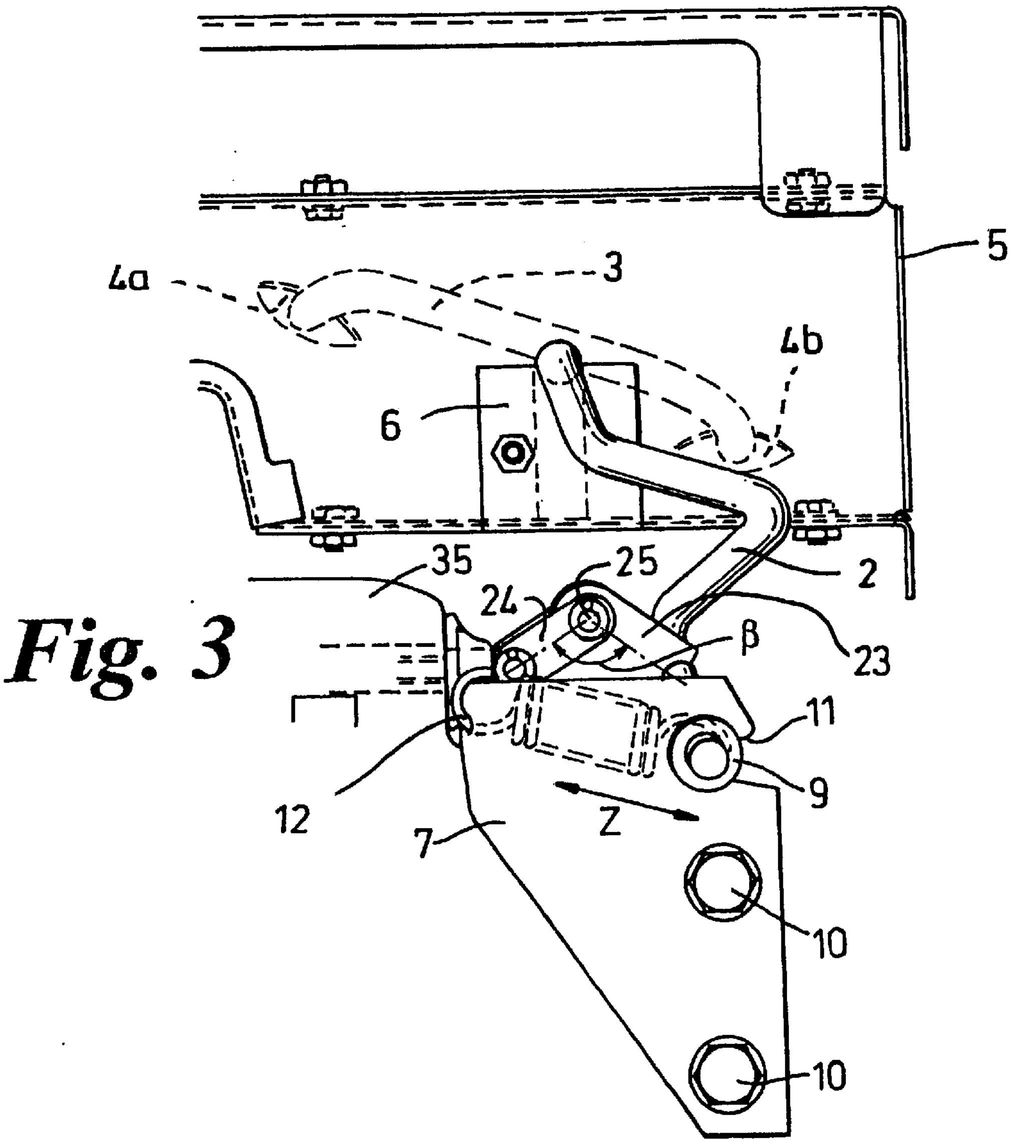
FIG. 3 is an end view of the differential lock control system shown in FIGS. 1 and 2.

Referring now to FIGS. 1 to 3 there is shown a pedal arrangement 1 mounted on a tractor, the pedal arrangement comprising an elongate rod 2 to one end of which there is connected a substantially U-shaped member 3. Pedals 4*a,* 4*b* are attached to each of the free ends of the U-shaped member 3.

The elongate rod 2 is supported in brackets at each of its ends. The pedal end is supported in a part of the seat deck 5, which forms part of the tractor X. A reinforcement plate 6 is attached to the seat deck 5 to strengthen the support. At the pedal end the elongate rod may rotate about its own axis, but is otherwise constrained from movement.

The free end of the elongate rod 2 is mounted in a bracket 7, which is attached to the back axle 37 of the tractor X by bolts 10. The bracket 7 comprises a slot 11 in which the free end of the elongate rod 2 is mounted. The elongate rod 2 is constrained from axial movement by means of washers 8, 9, which are secured to the said rod 2.

It can be seen from FIG. 1 that in plan view the bracket 7 is substantially L-shaped. A spring 12 is provided to bias the elongate rod 2 towards the chassis of the tractor X. One end of the spring 12 is attached to the bracket 7, whilst the other is attached to the elongate rod 2. In the position shown in FIGS. 1 to 3, the free end of elongate rod 2 sits in the slot 11, and rests against the closed end of the said slot.

Figure 4:
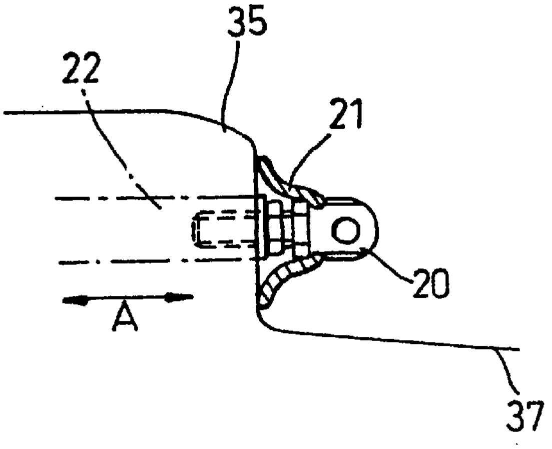
FIG. 4 is side view of a component of the differential lock control system shown in FIGS. 1 to 3.

FIG. 4 illustrates the differential lock engagement pin. The pin 22 is mounted in the crown wheel and pinion housing 35. A bracket 20 is mounted externally of the housing 35 and is attached to the pin 22. The bracket 20 has a threaded portion, which is screwed into the pin 22, and a flexible cusp 21 is provided between the bracket 20 and the side of the crown wheel and pinion housing 35.

The pin 22 is slidably mounted in the housing 35 so that it can move in the directions indicated by arrow A. Moving the pin 22 to the left engages the differential lock, whereas moving the pin 22 to the right disengages the differential lock.

Referring again to FIGS. 1 to 3, it can be seen that a bracket 23 is attached to the elongate rod 2. The bracket 23 is connected to a pair of links 24 by means of a pin 25. The links 24 are also connected to the bracket 20, again by means of a pin 25.

The pin 22 is moved in the directions indicated by the arrow A by depressing one of the pedals 4*a*, 4*b*.

The manner in which the differential lock control system works will now be explained with reference to FIGS. 1 to 4.

With the pedal 4*a* in the position shown in the FIGS. 1 to 3, i.e. uppermost, the pin 22 is withdrawn from the differential and the differential lock is disengaged. When the driver of the tractor depresses pedal 4*a* the elongate rod 2 rotates about its own axis Y—Y. The pin 2 is pushed to the left in the direction indicated by arrow A. As the pedal 4*a* is being depressed the link 23 moves through an arc, and at the same time pivots with respect to the link 25. In FIG. 3 the angle β is acute. When the pedal 4*a* has been depressed, the pin 25 connecting the bracket 23 to the links 24 moves over centre so and the angle β becomes obtuse. The spring 12 holds the pin 22 in the engaged position.

If the driver wishes to disengage the differential lock he depresses the pedal 4*b*. This causes the elongate rod 2 to rotate about its axis Y—Y back into the position shown in FIGS. 1 to 3.

It can be seen from FIG. 3 that the slot in which the end of the elongate rod 2 rests has an open end. At the moment the driver decides to depress the pedal 4*a* to engage the differential lock, the dogs of the differential lock may not be aligned. If this is the case the free end of the elongate rod 2 will move away from its seat in the slot 11 as the pedal 4*a* is depressed. The pin 25 connecting links 24 to bracket 23 will still move over centre. The pin 22 will move to the left in the direction indicated by arrow A when the dogs of the differential lock are aligned. This provides for engagement of the differential lock when the tractor is on the move.

Figure 5:
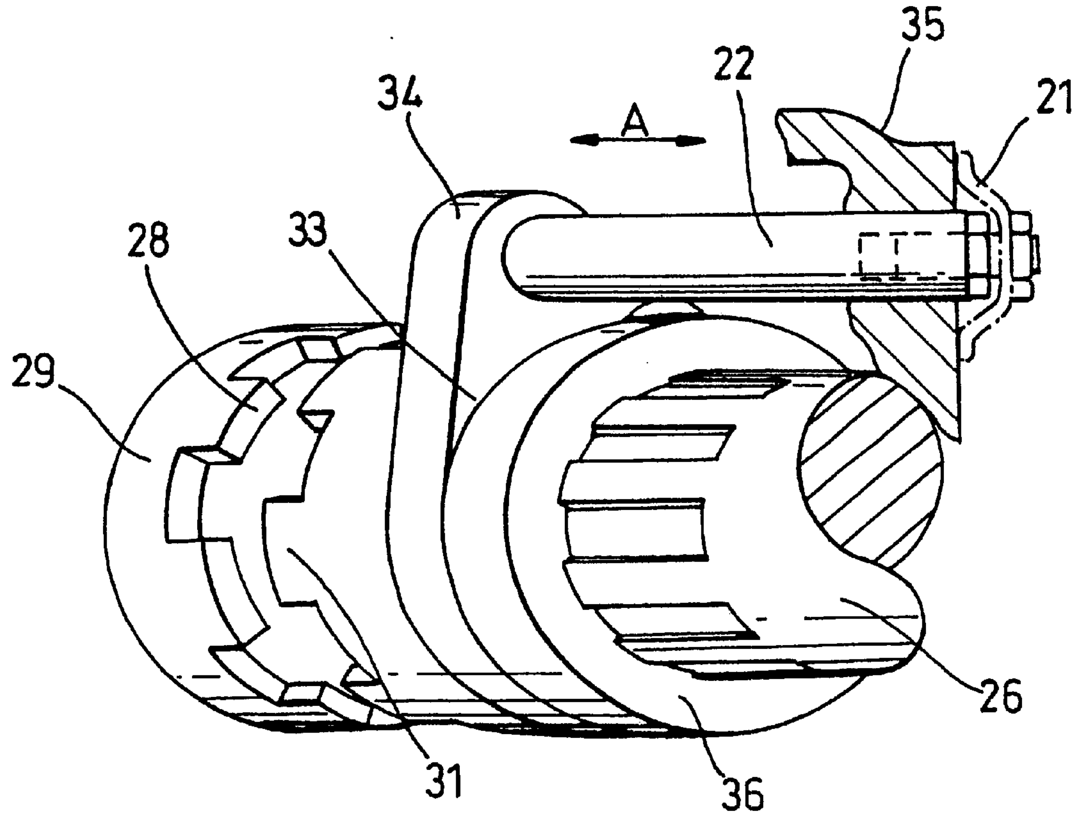
FIG. 5 is a schematic illustration of a differential lock mechanism operable by a control system of the invention.

Referring now to FIG. 5, there is shown a differential locking mechanism 34, in the form of a sleeve 36 splined on to a shaft 26 which carries a differential pinion gear. Sleeve 36 has teeth 31 which are engageable with corresponding teeth 28 provided on part of a support 29 for the crown-wheel of the differential. Thus in order to engage the differential lock it is necessary to move the operating rod 22 in the direction A to engage teeth 31 and 28. This is achieved by depressing the pedal 4*a* which pivots the elongate rod 1 about axis Y—Y and causes the over-centre cam mechanism to move from the differential lock disengaging position to the differential lock engaging position. If the teeth 31 and 28 are not aligned for engagement so that rod 22 cannot be moved by plunger 30,the rotation of the elongate rod 1 caused by depression of the pedal 4a results in the elongate rod 1 moving in the direction Z in FIG. 1, this movement tensioning the spring 12. The energy stored in the spring is then used to move the rod 22 when the teeth 31, 28 are aligned.

The differential lock engaging arrangement of the invention meets the operational requirements of a tractor operator insofar as it can be engaged on the move, once engaged the operator may remove his foot from the pedal, and engagement and disengagement only requires the operator to depress the uppermost pedal. The arrangement is simple to manufacture, and maintain, and is not subject to a great deal of wear because it comprises relatively few moving parts.

What we claim is:

1. A differential lock mechanism and actuator assembly comprising:

a differential lock mechanism including a pin that is movable between a first position, wherein said differential lock mechanism is engaged, and a second position, wherein said differential lock mechanism is disengaged; and an actuator for effecting movement of said pin between said first and second positions, said actuator including:

a bracket having a slot formed therethrough defining a seat;

a member including a first end having a pedal secured thereto and a second end that extends through said slot and is supported on said bracket for rotational movement; and a connector connected between said member and said pin such that rotational movement of said member causes movement of said pin between said first and second positions; and a spring urging said second end of said member into engagement with said seat of said slot.

* * * * *

UNITED STATES PATENT AND TRADEMARK OFFICE

CERTIFICATE OF CORRECTION

PATENT NO. : 6,390,226 B1
DATED : May 21, 2002
INVENTOR(S) : Derek John Smith and David William Seccull It is certified that error appears in the above-identified patent and that said Letters Patent is hereby corrected as shown below:

Title page,
Item [73], Assignee, change "ARGO Limited (GB)" to -- AGCO Limited (GB) --

Signed and Sealed this

Twenty-third Day of July, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,390,226 B1

DATED : May 21, 2002

INVENTOR(S) : Derek John Smith and David William Seccull

It is certified that error appears in the above-identified patent and that said Letters Patent is hereby corrected as shown below:

<u>Column 4,</u>
Line 58, after Claim 1, add the following claims:

2. The differential lock mechanism and actuator assembly defined in Claim 1 wherein said connector includes an actuator bracket connected to said member for movement therewith and a link that is connected between said actuator bracket and said pin.

3. The differential lock mechanism and actuator assembly defined in Claim 2 wherein said link is pivotably connected to said actuator bracket and to said pin.

4. The differential lock mechanism and actuator assembly defined in Claim 2 wherein said spring cooperates with said connector to function as a over-center cam mechanism to retain said pin in either of said first and second positions.

5. The differential lock mechanism and actuator assembly defined in Claim 1 wherein said connector includes an actuator bracket connected to said member for movement therewith and a pair of links that is connected between said actuator bracket and said pin.

6. The differential lock mechanism and actuator assembly defined in Claim 1 wherein said spring reacts between said bracket and said member to urge said second end of said member into engagement with said seat of said slot.

7. The differential lock mechanism and actuator assembly defined in Claim 1 further including a pair of stops secured to said member on opposite sides of said bracket to limit movement of said member relative to said bracket.

8. The differential lock mechanism and actuator assembly defined in Claim 7 wherein said pair of stops is a pair of washers.

9. The differential lock mechanism and actuator assembly defined in Claim 1 wherein said pedal includes first and second pedals that are connected to the ends of a intermediate member connected to said member.

Signed and Sealed this

Thirteenth Day of May, 2003

JAMES E. ROGAN
*Director of the United States Patent and Trademark Office*